(12) United States Patent
Marmor

(10) Patent No.: US 6,601,108 B1
(45) Date of Patent: Jul. 29, 2003

(54) AUTOMATIC CONVERSION SYSTEM

(75) Inventor: Eliyahu Marmor, Kfar-Saba (IL)

(73) Assignee: Netmask (El-Mar) Internet Technologies Ltd., Kfar-Saba (IL)

(*) Notice: Subject to any disclaimer, the term of this patent is extended or adjusted under 35 U.S.C. 154(b) by 0 days.

(21) Appl. No.: 09/284,272

(22) PCT Filed: Mar. 24, 1998

(86) PCT No.: PCT/IL98/00134
§ 371 (c)(1),
(2), (4) Date: Apr. 12, 1999

(87) PCT Pub. No.: WO98/44424
PCT Pub. Date: Oct. 8, 1998

Related U.S. Application Data

(60) Provisional application No. 60/041,623, filed on Mar. 27, 1997.

(30) Foreign Application Priority Data

Jun. 12, 1997 (IL) .................................. 121071

(51) Int. Cl.⁷ .............................................. G06F 15/16
(52) U.S. Cl. ........................ 709/246; 709/217; 709/219; 709/226; 709/229
(58) Field of Search ................................ 709/246, 217, 709/219, 226, 229, 235, 238, 239

(56) References Cited

U.S. PATENT DOCUMENTS

| | | | |
|---|---|---|---|
| 5,522,041 A | | 5/1996 | Murakami et al. |
| 5,649,214 A | * | 7/1997 | Bruso et al. .................... 704/8 |
| 5,673,322 A | * | 9/1997 | Pepe et al. ..................... 380/49 |
| 5,682,158 A | * | 10/1997 | Edberg et al. ................. 341/90 |
| 5,727,159 A | * | 3/1998 | Kikinis ........................ 709/246 |
| 5,751,957 A | * | 5/1998 | Hiroya et al. ................ 709/203 |
| 5,784,071 A | * | 7/1998 | Tang et al. .................. 345/467 |
| 5,826,025 A | * | 10/1998 | Gramlich ..................... 709/217 |
| 5,848,386 A | * | 12/1998 | Motoyama ...................... 704/5 |
| 5,884,246 A | * | 3/1999 | Boucher et al. ................ 704/2 |
| 5,918,013 A | * | 6/1999 | Mighdoll et al. ........... 709/217 |
| 5,974,371 A | * | 10/1999 | Hirai et al. ..................... 704/2 |
| 5,987,256 A | * | 11/1999 | Wu et al. .................... 395/707 |
| 6,049,831 A | * | 4/2000 | Gardell et al. .............. 709/236 |
| 6,073,143 A | * | 6/2000 | Nishikawa et al. .......... 707/513 |
| 6,122,666 A | * | 9/2000 | Beurket et al. ............. 709/226 |
| 6,185,625 B1 | * | 2/2001 | Tso et al. .................... 709/247 |
| 6,247,048 B1 | * | 6/2001 | Greer et al. ................. 709/219 |

FOREIGN PATENT DOCUMENTS

EP 0 872 990 A1 10/1998

OTHER PUBLICATIONS

Gavin Nicol; "The Multilingual World Wide Web"; "http://www.sil.org:80/sgml/nicol–multwww.html"; Nov. 1994.
Kunio Gota & Masaya Nakayama,; "Summary of K12 Activities in Japan" URL "http://k12.jain.ad.jp/inet95.html" Jun. 26, 1995.
Israel–MultilingualWebAuthoringPackage,NewsBytes, PNEW07140025;Jul. 14, 1995.
WindowsPRGMSupportsMultilingualWebPages;NewsBytes,PNEW0615002,Jun. 15, 1995.
Schwerin,Rich; All You Need to Surf, pc/computing,v9,n9, p338(2); Sep. 1996.
InternetSoftwareUpdate,Newsbytes,pNEW05010016; May 1, 1996.

* cited by examiner

*Primary Examiner*—Saleh Najjar
(74) *Attorney, Agent, or Firm*—Fenster & Company

(57) ABSTRACT

A method for transferring information between a server (24) and a client (28), through a converter (22), comprising: analyzing at least a portion of the information by the converter (22), to determine a standard used by the server (24) to encode the information in the portion; and replacing at least a portion of the analyzed information with other information, which other information uses a second standard, analyzing comprises parsing the information on a syntactic level and wherein the information comprises at least one Internet hypertext document.

66 Claims, 6 Drawing Sheets

```
<HTML><HEAD><TITLE>Example</TITLE></HEAD><BODY
BACKGROUND="bg.gif">
<H1>Example</H1>                    10
HTML supports <FONT COLOR="#FF0000">red</FONT>, and many other
colors.<BR>
It also supports various <FONT SIZE=+4>s</FONT><FONT
SIZE=+3>i</FONT><FONT SIZE=+2>z</FONT><FONT
SIZE=+1>e</FONT>s.<BR>
It even supports any <FONT SIZE=+5
COLOR="#FF0000">combination</FONT>.<BR>
<FORM METHOD=GET ACTION="cgi.bin">Do you agree?
<INPUT TYPE=text NAME=name><INPUT TYPE=submit>
</FORM></BODY></HTML>
                                     12
```

Fig. 2A

```
<HTML><HEAD><TITLE>Example</TITLE></HEAD><BODY
BACKGROUND="bg.gif">
<H1><IMG ALIGN=ABSMIDDLE SRC=GAAAAFhXYtBHblB.b64></H1>
<IMG ALIGN=ABSMIDDLE                    14
SRC=DAAAAIRVTMByc1BHcvJHdzBC.b64><FONT COLOR="#FF0000"><IMG
ALIGN=ABSMIDDLE SRC=D@DAAyVGZ.b64></FONT><IMG
ALIGN=ABSMIDDLE
SRC=DAAAAsASYuRGItFmb5Byb0hWZyByYvx2byNnL.b64><BR>
<IMG ALIGN=ABSMIDDLE
SRC=DAAAAJRHIhx2cvByc1BHcvJHdzBidhJXavV3cgA.b64><FONT
SIZE=+4><IMG ALIGN=ABSMIDDLE SRC=GAAAAzB.b64></FONT><FONT
SIZE=+3><IMG ALIGN=ABSMIDDLE SRC=GAAAApB.b64></FONT><FONT
SIZE=+2><IMG ALIGN=ABSMIDDLE SRC=FAAAA6B.b64></FONT><FONT
SIZE=+1><IMG ALIGN=ABSMIDDLE SRC=EAAAAIB.b64></FONT><IMG
ALIGN=ABSMIDDLE SRC=DAAAAz5C.b64><BR>
<IMG ALIGN=ABSMIDDLE
SRC=DAAAAJRHI1ZXZuByc1BHcvJHdzBSYulHI.b64><FONT SIZE=+5
COLOR="#FF0000"><IMG ALIGN=ABSMIDDLE
SRC=G@DAAj9WbilmbhRXav5G.b64></FONT><IMG ALIGN=ABSMIDDLE
SRC=DAAAAuA.b64><BR>
<FORM METHOD=GET ACTION="cgi.bin"><IMG ALIGN=ABSMIDDLE
SRC=DAAAAE9GI59WdgE2ZyVWZ@A.b64>         16
<APPLET CODE="text.class" HEIGHT=40 NAME="name" WIDTH="100">
</APPLET><APPLET CODE="submit.class" WIDTH=60 HEIGHT=30
NAME="cgi.bin"></APPLET></FORM></BODY></HTML>
```

Fig. 2B

AUTOMATIC CONVERSION SYSTEM

RELATED APPLICATIONS

This application is a U.S. national filing of PCT Application No. PCT/IL98/00134, filed on Mar. 24, 1998. This application claims the benefit under 119(e) of U.S. Provisional Application No. 60/041,623 filed on Mar. 27, 1997.

FIELD OF THE INVENTION

This invention is related to the field of multi-lingual and multi-standard communication between independent computers and, in particular, to automatic conversion between different standards.

BACKGROUND OF THE INVENTION

One of the fastest growing applications on the Internet is the world-wide web (WWW) The WWW is a collection of networked computers which exchange pages of hyper-text using the TCP/IP protocol. These pages may contain combinations of text, images and sounds, each of which may be either dynamic or static. Hyper-text is also called hyper-media or hyper-links. In addition, these pages may provide various methods of data input, for example, fill-in forms. In the context of the VAE, the pages are also called documents. The computers may be roughly divided into two main classes, clients and servers. The pages are usually downloaded from the servers by a client, using a specialized program called a "browser". In some cases, the client enters data onto a page, and transmit this data to a server. This data is usually used to find new pages for the client to download. Alternatively to storing pages on a server, it is becoming a common practice to generate WWW pages on-the-fly at the server, using special programs.

There exist several additional classes of computers, including, search engines, which provide a list of pages on servers which relate to a particular search; proxy servers, which broker communications between clients and servers, for example, by locally storing frequently read pages; and gateways, which connect whole networks to the Internet. A rapidly growing subset of the "client" class of computer is the network computer, which is a specialized computer which is especially designed for connection to the Internet. Included in this sub-class are also Internet telephones and Internet TVs, all of which are not general purpose computers and have their Internet support hard-wired rather than programmed in software.

One of the greatest obstacles to the continued expansion of the Www is the multilingual aspect of the data transmitted, which is compounded by language limitations of users. Currently, most of the pages in the WWW are written in English and most of the browsers and the servers are designed mainly for use with the English language. This situation is equivalent to having a telephone system which can only transmit words in English and a TV system which can only transmit programs in English.

Multi-lingual computer applications are known, for example multi-lingual word processors and even multi-lingual operating systems. However, unlike the Internet, in a computer application the system developer enforces a single standard of language representation and handling. In the Internet, there is no single system developer and it is not possible to enforce a single standard worldwide. Furthermore, there may be multiple standards in a single country. For example, in Japan there are three common character code set encodings for the Japanese language; in Israel, there are several common character sets and three different standards for display and input of textual information. There also exist many variants of the display standards in Israel. It should be appreciated that for many aspects of multi-lingual language support there is no common denominator between the different standards.

The Internet publication "The Multilingual World Wide Web", written by Gavin Nicol in November 1994, and currently found at the URL: "http://www.sil.org:80/sgml/nicolmultwww.html", describes four main failure modes of multi-lingual computer applications and discusses their relevance to the WWW. The first failure mode is related to data representation, i.e., how textual data is represented and how individual characters are encoded. As noted above, there are three such encoding standards in Japan and several in Israel. Further, the same character code may be used for different glyphs depending on the language and on the character set.

The second failure mode is related to data manipulation, where a given program cannot manipulate multi-lingual data. Some browsers do not support fonts which require more than 8 bits for encoding. Unicode, for example, requires 16 bits. None of the leading browsers are designed to support variable width (in bits) character codes.

The third failure mode is data display. It should be noted that in many languages, such as Arabic, the glyph form of a letter is dependent on the surrounding letters. This requires various display algorithms. In addition, the number of languages and fonts in the world are much greater than the number usually stored in a client computer, especially if it is a specialized network computer. Also, when using some browsers it is not possible to simultaneously display more than one language at a time (in addition to English).

The fourth failure mode is related to data input. One issue is keyboard mapping assuming that a browser supports the font of the language used by the server, how should the browser map keystrokes to the individual glyphs. Many languages, such as Russian, require more than the standard 26 letters of English. Another issue is support for bi-directional data input. Some languages, for example, Hebrew and Arabic, are written from right to left (RTL) rather than from left to right (LTR), as English is. Other, oriental, languages are written in a vertical orientation.

There are several problems unique to bi-directional languages. Even when the language is written RTL, numbers are (usually, but not in all "standards") written LTR. In addition, the text may be stored in a "logical" manner, where the first stored letter is usually the rightmost letter. Alternatively, the text may be stored in a "visual" manner, where the first stored letter is the leftmost letter, which in a multi-line text is located in the middle of the text. Thus, visually stored data is displayed LTR (with an appropriate font), while logically stored data must be displayed on a letter-by-letter basis—LTR letters displayed one way and RTL letters displayed in another way. It is a common practice to mix visual and logical representations in a single WWW page. This is particularly true for input. The input is most conveniently made using a logical representation, even though the data may be stored using a visual representation.

These above problems are compounded when viewed in the context of the WWW. One example of such a problem relates to search engines. Search engines automatically assimilate the contents of many WWW pages and allow a client to search these pages using various methods. If a page is stored using a visual representation, a search using keywords entered using a logical representation will not find the page. Of course, if the character set encoding is different, the page will not be found either. Another example, also relating to search engines arises in languages where there is more than one legal way to spell a word. This is common in various dialects of English, but in Thai, there is a lexical equivalence between various orderings of certain three-letter groups. Since search engines are inherently global, enforcing a single standard is practically impossible.

Another example of a compound problem is the use of multiple standards and/or languages in a single WWW page. Another compound problem is translating between units of measurements and ways of writing dates and times. For example, "1/6/1999" represents Jan. 6, 1999 in the US and Jun. 1, 1999 in Europe.

To make matters worse, even the standard language of the WWW pages, HTML (Hyper-Text Meta Language) is not uniform around the world.

As a direct result of these problems, the "global village" has not yet arrived. One pointed example can be seen in Israel. At the time of this writing, Israel is one of the world industrial leaders in most Internet applications. However, the penetration of the Internet into the public sector is substantially retarded as compared to the US, even though a higher percentage of households in Israel own a computer with a modem than in the US.

An obvious solution would be to adapt the clients and servers in the Internet so that they support multiple languages. In particular, automatic WWW page generators will also have to be modified. In addition, such adaptation will probably require modifications to development environments. The amount of work required for this type of adaptation is enormous, since every existing browsing software and/or hardware would have to be adapted, a single standard would have to be enforced and all new applications would be limited by having to support a great number of languages and standards. This would be contrary to the concept of network computers: providing only the minimal hardware and software for surfing the WWW. For this reason, among others, most "multi-lingual" solutions support only one language in addition to English. In many cases, the languages supported are not the two which are desired.

In an attempt to solve the problem of multi-lingual searching, a web site has been constructed in which a client enters search terms in one language (Hebrew) and the search engine translates the words to English and applies the translated words to one of a limited number of existing search engines. The input is entered using Latin characters, which the web site maps to Hebrew characters after the input process is finished.

In yet another attempt, a web site has been created in which a JavaScript code segment is included in a WWW page, which displays a virtual keyboard in the desired language and which allows a user to click on keys. Each click adds a letter to a text object. The input from the user is directed only to the web site and for use of the programs therein and does not allow communication with other web sites.

Several solutions for the problem of display of multi-lingual pages have been suggested and/or tried. The Microsoft Internet Explorer version 3.01, Hebrew version, uses meta-tags in the WWW page to indicate whether a text object uses visual encoding or logical encoding. This information is used to drive display algorithms for the text object.

In the above referenced WWW publication and in "Summary of K12 activities in Japan", by Kunio Goto and Masaya Nakayama, URL "http://k12.jain.ad.jp/inet95.html", a conversion server is suggested for use in Japan. The server is suggested for use as a proxy server and it replaces character codes from one standard set with codes from another set. This replacement is on a letter by letter basis.

In one system, "Internet with an Accent", published by Accent Software Ltd., Israel, multilingual pages are developed using a special development environment provided with the package. The pages are then stored in a special format. The client must either be provided with a special browser or with a plug-in to his existing browser. This package has the capability of automatically displaying pages in one of several languages based on the setting at the client. However, this package only works if both the client and the developer use the "Accent" package.

The common denominator to all of the above solutions is that they require changes to at least one, and usually at least two, of the client, the server and/or the development environment. As a direct result, the accessibility of advanced and newly developed features (for non-multi-lingual applications) is retarded. In addition, the above solutions are not easily portable to newly developed systems.

SUMMARY OF THE INVENTION

It is an object of some embodiments of the present invention to allow data to be exchanged between substantially any client and substantially any server in substantially any language or standard, without requiring any changes to be made in the server, client or even in a development environment in which the data is generated. Preferably, the server and the client communicate using a WWW protocol.

It is a particular aspect of some embodiments of the present invention to provide a solution to the input of multi-lingual information.

An automatic converter, in accordance with preferred embodiment of the invention is integrated into a client-server relationship as a (hidden) proxy. When the client downloads information from the server, the converter converts the information to a standard usable by the client. When the client enters input data to the server, the converter converts the input data to a standard usable by the server.

Thus, instead of the multi-lingual support increasing the complexity of the computer software on the client, the support is provided by the network itself, i.e., "the network is the computer".

In a preferred embodiment of the invention, the converter automatically determines the standard used by the server for a WWW page. Preferably, the converter automatically detects the language of at least a portion of the page.

Alternatively or additionally, the converter automatically detects the standard used by the client. Preferably the converter automatically detects the language used by the client. Alternatively, the client sends information to the converter regarding the client's capabilities. In one preferred embodiment of the invention, the converter queries the client regarding the client's capabilities. The client may respond automatically, or a user at the client may respond instead.

In a preferred embodiment of the invention, the client is provided with a manual override for the standard used by the server and/or the client. This feature is especially useful if the automatic standard detection does not properly detect the standard. Preferably, even if the automatic converter cannot pinpoint the precise standard used by the client and/or the server, the converter does attempt to narrow the possibilities. It should be appreciated however that automatic detection of standards may be adversely affected by the existence of mistakes in the WWW page, such as spelling mistakes.

It is a particular aspect of some embodiments of the present invention to provide a seamless connection between a client and a server, in which all data from the server is converted into data usable by the client and all data from the client is converted into data usable by the server.

In a preferred embodiment of the invention, data from the server which cannot normally be displayed on the client is converted, by the automatic converter, into image files for display on the client. Preferably, text data for which there is no available font on the client is converted in image data, for example GIF format data. Preferably, the text data is converted into a plurality of images. In a preferred embodiment of the invention, small groups of words are converted into a single GIF file, such that resizing of an object containing the text data is facilitated. Preferably, the number of words in a group is inversely related to the font size. Alternatively each group consists of a single word, to enhance caching.

In a preferred embodiment of the invention, information relating to the content and/or the format of the converted text is encoded into the name of the image file. Thus, the name of an image file may include an indication that the word is "the" and that it is underlined. Encoding the information in this manner increases the efficiency of cache systems.

Another aspect of some preferred embodiments of the invention relates to replacing input objects, which are not supported by the client, with custom made Java applets. In these embodiments, the converter replaces the definitions of input objects, in the pages sent by the server, with calls to Java applets. Preferably, the automatic converter parses the pages to determine the input objects and replaces the input objects which have no support at the client with Java applets. When the page is displayed by the client, the client is provided with a "new" input object, which supports the standards and/or language. This is most convenient for the client and which does not require support by the client's browser. Preferably, these Java applets are cached at the client for future pages, so that the applets need not be download anew with each page. Optionally the new input object is compatible with the server's standards. Alternatively, the converter converts the data entered using the input object to a standard supported by the server.

In a preferred embodiment of the invention, the Java applets which are used for input in a particular language render individual keystrokes as character glyphs even if the particular font required by the language is not supported by the client. Preferably the applets also provide other services, such as bidirectional input, letter fusion and even spell checking.

Another aspect of the present invention relates to controlling the viewing of copyrighted information. In a preferred embodiment of the invention, copyrighted information is provided through a conversion server, which server encodes the information so that it is difficult to copy using data manipulation programs, yet easy to assimilate using human senses, once displayed. Preferably, the display process is also protected so copying the displayed information is also difficult.

Typically, consumers must either pay to view copyrighted information or they are forced to view advertisement information along with the copyrighted information. However, once data is available in a computer readable format, there is a danger that an infringer will copy the data, remove any advertisements and redistribute the data himself, for his own enjoyment and/or profit.

Thus, in a preferred embodiment of the invention, an automatic converter brokers information between a client and an information provider, while providing and presenting the information to the client in a form which is not easily copied.

In a preferred embodiment of the invention, the client is provided with a program, preferably a Java applet, which temporally modulates the information, so that only small parts of the information are displayed at any instant. Thus, even though a human can integrate the displayed information, a snapshot of the displayed data will contain only partial amounts thereof. Some examples of temporal modulation include, displaying the data in a running strip and intermixing advertisements with the copyrighted information. Thus, after viewing the data, the client will not have in his possession a file containing only and all the displayed information.

In a preferred embodiment of the invention, client programs are authenticated. Preferably the authentication uses a key-code system in which the server sends a key to the client and the client is expected to respond with a code which is a (secret) function of the key. Preferably, a different key-code combination is used in each communication by the server. Preferably, the transmitted data is encrypted, to reduce the possibility of it being intercepted by a copyright pirate.

There is therefore provided in accordance with a preferred embodiment of the invention, a method for transferring information between a server and a client, through a converter, comprising:

analyzing at least a portion the information by said converter, to determine a standard used by said server to encode the information in the portion; and replacing at least a portion of the analyzed information with other information, which other information uses a second standard, wherein, analyzing comprises parsing the information on a syntactic level and wherein said information comprises at least one Internet hypertext document. Preferably, the standard comprises a language. Alternatively or additionally, the standard comprises a standard for an RTL language. Alternatively or additionally, replacing comprises replacing only a portion of the analyzed information.

There is also provided in accordance with a preferred embodiment of the invention, a method for transferring information between a server and a client, through a converter, which information includes at least one input object, comprising receiving said information by said converter from said server; replacing said input object with another input object; and transmitting the information after said replacing, wherein said information comprises at least one Internet hypertext document.

Preferably, the input object is a text object. Alternatively or additionally, said another input object is of a type supported by said client. Alternatively or additionally, said input object is of a type not supported by said client. Alternatively, said input object is of a type supported by said client.

In a preferred embodiment of the invention, replacing comprises replacing said input object responsive to a known difference in standards between said client and said server. Preferably, said another input object is not included in a toolkit portion of said client. Alternatively or additionally, said another input object is a call to a program. Preferably, said program is a Java applet.

In a preferred embodiment of the invention, the method comprises replacing a second input object with a Java applet, wherein said second input object is supported by the client.

There is also provided in accordance with a preferred embodiment of the invention, a method for transferring information between a server and a client, through a converter, comprising analyzing at least a portion of the information by said converter, to determine a standard used by said server to encode the information in the portion; and determining at least one portion of said information not supported by said client, wherein said information comprises at least one Internet hypertext document.

Preferably, the method comprises replacing said at least one portion with a portion supported by the client. Alternatively or additionally, said standard comprises a language. Alternatively or additionally, said standard comprises a standard for an RTL language.

There is also provided in accordance with a further preferred embodiment of the present invention, a method for transferring information between a server and a client, through a converter, comprising:

selecting an output portion of said information, which information is designated for the client and comprises at least one Internet hypertext document, which portion has a particular appearance when displayed by a client compatible with output portion; and replacing the output portion with other data, having a similar outward appearance as the output portion, when the other data is displayed by the client for which the information is designated.

Preferably, said other data is image data. Alternatively or additionally, said output portion is textual data. Alternatively or additionally, selecting an output portion comprises selecting an output portion not compatible with said client. Alternatively or additionally, said other data comprises a reference to a data file and wherein said reference encodes at least a portion of the content of said output portion. Alternatively or additionally, said other data is generated on-the-fly. Preferably, said other data is generated at the converter.

There is also provided in accordance with a preferred embodiment of the present invention, a method for transferring information between a server and a client, through a converter, each of said client and said server using different standards to encode said information, comprising:

receiving data from said client;

changing said received data from a known standard of the client to a known standard of the server; and transmitting said changed data to said server, wherein said data and said changed data comprise at least one Internet hypertext document.

Preferably, said standards differ in language. Alternatively or additionally, said standards differ in logical/visual representation of an RTL language. Alternatively or additionally, said standards differ in character set encoding. Alternatively or additionally, said standards differ in character bit width.

There is also provided in accordance with a preferred embodiment of the invention a method for transferring information between a server and a client, through a converter, comprising:

detecting a text portion of said information by said converter, which portion comprises ordered characters having a meaning in a first representation and which information comprises at least one Internet hypertext document; and changing the order of at least some of said characters, such that the text portion has the same meaning in a second representation.

Preferably, changing the order comprises changing the order characters responsive to a known display method used by said client.

There is also provided in accordance with a preferred embodiment of the invention, apparatus for brokering the transmission of information between a server and a client, comprising:

a connection to said client;

a connection to said server; and a converter which receives an Internet hypertext document from the server through the connection to the server, adds a control to the document and transmits the document to the client through the connection to the client, wherein said control is operable to allow a user to enter configuration information for said converter.

Preferably, said control is operable to download a data entry form from said converter.

There is also provided in accordance with a preferred embodiment of the invention, apparatus for brokering the transmission of information between a server and a client, comprising:

a connection to said client;

a connection to said server; and a converter which receives an Internet hypertext document from the server through the connection to the server, changes an object in the document and transmits the changed document to the client through the connection to the client.

Preferably, said converter adds an object to the document. Alternatively or additionally, said converter removes an object from the document. Alternatively or additionally, said converter replaces an object on the page with another object. Alternatively or additionally, said object comprises an object to be displayed by said client. Alternatively, said object comprises an object which accepts input at said client.

In a preferred embodiment of the present invention, the apparatus comprises a server. Preferably, the server and the converter are comprised in a single computer. Alternatively or additionally, the server and the converter operate as a single process.

There is also provided in accordance with a preferred embodiment of the invention, a method for controlling the viewing of copyrighted information, transmitted from a data source to a client, on the Internet, comprising:

transmitting the information from the data source to a server, wherein said information is in a format viewable by the client;

converting the information, at the server, to an encoded form;

transmitting the encoded form of the information to the client; and decoding and displaying, at the client, of the encoded information, wherein said encoding and decoding makes said information less available to copying by said client.

Preferably, the format of said information is a format used on the Internet. Preferably, said format is a HTML format.

Alternatively or additionally, displaying comprises temporally modulating the display of the information.

Alternatively or additionally, decoding comprises decoding by a server-provided program. Preferably, the server-provided program requires a live connection with said server. Alternatively or additionally, the server-provided program is downloaded from the server. Alternatively or additionally, the method includes authenticating the server-provided program to the server. Alternatively or additionally, converting comprises converting said information to a form unusable by said client without said server-provided program.

In a preferred embodiment of the invention, converting comprises encrypting. Alternatively or additionally, converting the information comprises converting only a portion of the information.

BRIEF DESCRIPTION OF THE FIGURES

FIGS. 2A and 2B show a portion of a HTML page before and after automatic conversion, in accordance with a preferred embodiment of the invention;

DETAILED DESCRIPTION OF PREFERRED EMBODIMENTS

Figure 1A:
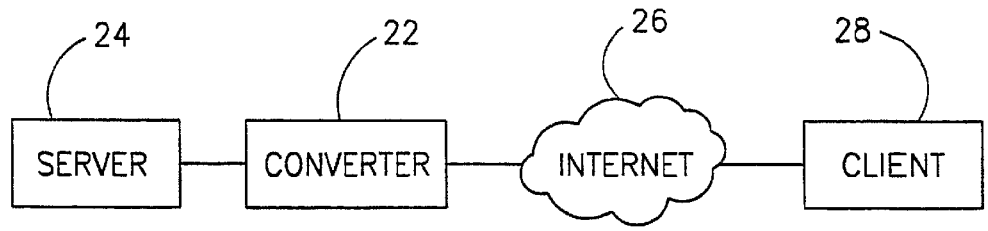
FIGS. 1A–1C are schematic diagrams illustrating preferred network topologies for integrating an automatic converter, in accordance with a preferred embodiment of the invention, into a network.

FIG. 1A shows a configuration 20 of an interconnection of a server 24 and an automatic converter 22, connected via an Internet 26 to a client 28, in accordance with a preferred embodiment of the present invention. As used herein, "Internet" includes also "Intranet" and "WWW" includes using the WWW tools and protocols on an Intranet. FIG. 2A shows a portion of an HTML file downloaded by client 28 from WWW server 24. A reference number 10 indicates a text output object to be displayed and a reference number 12 indicates an input request object. Displaying the HTML file at client 28 is usually performed using a browser. In a multi-lingual situation (where server 24 and client 28 do not support the same languages), it is entirely possible that client 28 is not capable of displaying text object 10, for example, for lack of a suitable font. In addition, it is even more usual that client 28 is not capable of performing the input request 12, for example, if the client does not have a keyboard mapping for the language used by server 24.

In accordance with a preferred embodiment of the invention, incompatible portions of the HTML file are automatically converted by converter 22 such that client 28 is capable of displaying the information in text object 10 and/or performing input request 12. Preferably, this process is substantially invisible to client 28 and server 24. When client 28 requests a file from server 24, server 24 supplies the file to converter 22. Converter 22 modifies the file, on the fly, so that displaying the information in the file will be within the capabilities of client 28 and sends the modified file to client 28. If input is entered at client 28, which input is not compatible with server 24, converter 22 converts the input to a form usable by server 24.

In a preferred embodiment of the invention, converter 22 replaces input objects with Java applets, for example, an applet 16. These Java applets enable a user at client 28 to enter data in a manner which is more comfortable for him and which manner is not otherwise supported by client 28. Preferably, the applet supports keyboard mapping, character combining and/or different types of display of RTL languages. JavaScript, BasicScript and ActiveX may be used instead of Java, however, they are less preferred due to their technical limitations and because they are not as widely used as Java.

Figure 1B:
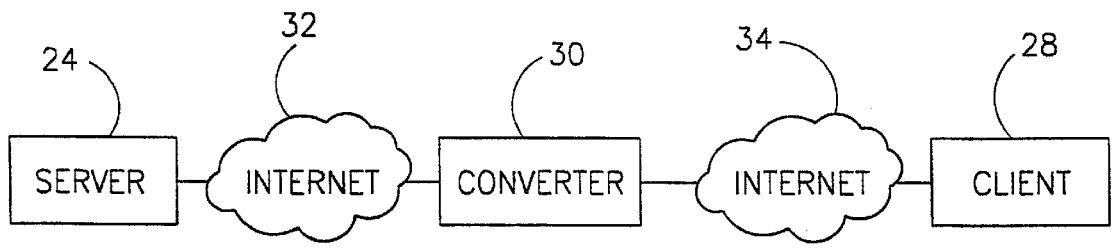
Figure 1C:
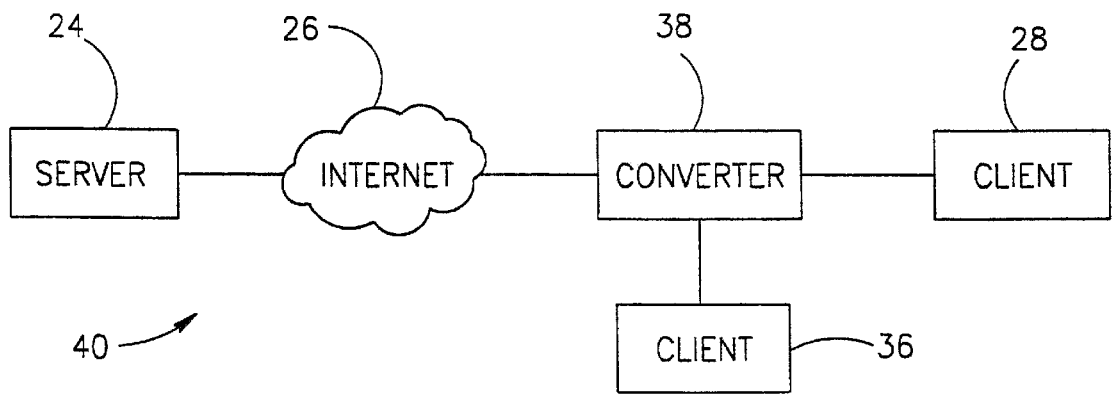

FIGS. 1A–1C show various configurations for connecting an automatic converter in an Internet configuration in accordance with preferred embodiments of the invention. FIG. 1A shows configuration 20, where converter 22 is associated with server 24 and separated by Internet 26 from client 28. Thus, communication between converter 22 and server 24 is facilitated. This configuration is useful if converter 22 comprises a proxy server or a gateway for the server. However, when high bandwidth communication between converter 22 and client 28 is required, this configuration is not optimal. It should be appreciated that converter 22 typically increases the volume of data which it transfers and usually adds to the number of files transferred. For example, the file in FIG. 2B is larger than FIG. 2A, even without including the attached image files for FIG. 2B. However, this increase in file size is deemed to be insignificant, especially when compared to the planned transmission of audio and video information on the Internet and in view of the rapid increase in the available communication bandwidth.

In some preferred embodiment of the invention, the server and the converter are comprised in a single computer. In one embodiment of the invention, WWW pages are automatically generated by an automatic page generator on server 24 and passed to converter 22, which converts them for client 28. Preferably, the page generator is incorporated into converter 22, such that they operate as a single (CPU) process. It should be appreciated that server 24 handles the requests from client 28, controls the page generator and, in this embodiment, converter 22.

FIG. 1B shows a configuration 30 in which a converter 30 is separated from server 24 by an Internet 32 and separated from client 28 by an Internet 34. In this configuration, neither communication between converter 30 and client 28 nor communication with server 24 are facilitated. However, this configuration may be desirable if converter 30 servers as a server or as a translation-service provider which is not associated with any particular client or server. In such an application, converter 30 preferably adds promotional information to pages downloaded by client 28. Converter 30 may add promotional or other information also in other configurations of connections between converter 30, server 24 and client 28.

FIG. 1C shows a configuration 40 in which a converter 38 is associated with client 28. In this configuration, converter 38 may serve as a proxy an/or gateway for client 28. In a preferred embodiment of the invention, converter 38 is connected by LAN (Local Area Network) to client 28 and possibly to an additional client 36. Alternatively, converter 38 is run on the same computer as client 28. It should be appreciated that since the communication between converter 38 and client 28 is based on TCP/IP, the physical locations of the server, converter and client are transparent, except for issues related to the communication of data.

Figure 3:
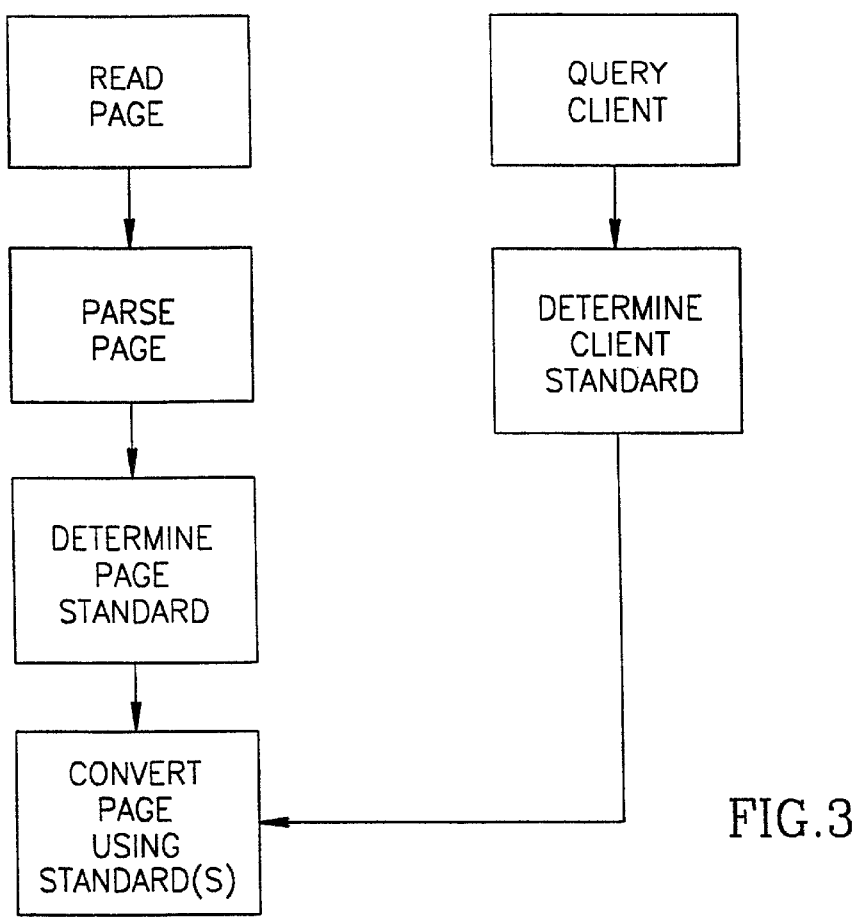
FIG. 3 is a flowchart of a process for determining what standards should be used by a converter, in accordance with a preferred embodiment of the present invention.

FIG. 3 is a flowchart showing a page reading and conversion process in accordance with a preferred embodiment of the invention. When a page download is requested by client 28, converter 38 receives the desired page from server 24. A parser in converter 38 then parses the page to determine input and output objects. As can be appreciated, if converter 38 is used for converting elements other than input and output objects, the parser will analyze those elements too. The parser can be a very fast parser, because, in a preferred embodiment of the invention the parser does not need to perform a complete syntactic analysis of the page. Rather, the parser can obtain most of the information it needs by identifying the input and output objects and tags in the page. Further, the simplicity of the parser provides some protection against improperly structured WWW pages.

After parsing the page, the standards used by the server are determined, preferably automatically. In some cases the WWW page includes meta-tags which indicate the standard and/or language of particular objects. However, the use of such meta-tags is neither common, nor does a single world-wide standard govern their use. Detecting the standard(s) used by the server or, more usually, limiting the number of possible standards, is preferably a heuristic process. One heuristic may be used for detecting the character set-encoding. In a large amount of text, it may be expected that most of the characters are letters. By analyzing the distribution of the character codes, it is usually possible to determine which character codes represent letters, the number of letters in the character set and whether there are special letters at the beginning or at the end of a word. Further, some languages are characterized by a particular distribution of letters in the language, for example in English, the most common letters are T, N, O and E. Further, the distributions at the end of words is different, in many languages, from at the beginning of words. Also, some letter pairs or triplets may be common in a particular language, e.g., "th" and "ing" in English. It is also usually possible to detect which character codes represent numbers. If converter 38 is loaded with most (if not all) of the possible standards, the choice can be limited to those standards which are reasonable in view of the page downloaded from server 24. Preferably, each output object is separately analyzed, since multiple languages and/or standards per page are possible. The set of possible languages may be guessed based on the server location. A particular type of standard which may be determined using these methods is whether an RTL language is stored in a visual or logical manner. In RTL languages, such as Hebrew, the letters at the end of a word may use different glyphs than at the beginning of a word. By detecting an end-letter at a beginning of a word, is can be determined whether the language is stored visually rather than logically. If such an endletter is detected in a middle of a word, than the language is probably not such an RTL language or the character set encoding is not as expected. Also, some RTL language standards use special direction changing control codes, which are not letters and which are usually located in an output object between RTL portion (language) and LTR portions (numbers and other languages). The particular code value of such a control code and its location may also be used to indicate the standard.

As can be appreciated, such an automatic detection method may fail, at times. This failure may be due to a text portion being too short or ambiguous or it may be due to mistakes in the WWW page. One common mistake (in Hebrew) is the inadvertent replacement of a regular letter with a similar-looking end-letter. In addition, end-letters are sometimes not used in some words. Preferably, such common mistakes and inconsistencies are registered in converter 38 and are ignored thereby.

In a preferred embodiment of the invention, converter 38 adds a control, such as a push-button, to the page. When a user presses the button, a configuration page is downloaded from converter 38. Alternatively, the control activates a Java applet which displays a configuration form. The configuration page enables the user to select the standard of the page. Preferably, data is entered using a form. Preferably, the user can see the effect of his selection on at least a sample of the page. Further preferably, the user can select a different standard for each portion of the page, using the configuration page. The user may also use the configuration page to indicate the capabilities of client 28. As can be appreciated, each downloaded page may use a different standard.

In a preferred embodiment of the invention, the user can configure converter 38 with a user-defined standard. A user-defined standard is useful for standards which are not yet registered in converter 38. Also, many standards have small variations, not all of which can be automatically detected. In a preferred embodiment of the invention, a user can upload a user defined standard to converter 38. An uploaded standard may include definitions of code ranges, heuristics for determining the standard or even Java applets for affecting the conversion. Java applets may include input-object applets as describe below.

The capabilities of the browser at client 28 may be registered using a configuration page, as described above. Alternatively, the capabilities of each type of browser are stored in converter 38. Further alternatively, converter 38 queries client 28 regarding its browser type and/or its capabilities. If the amount of text entered by the user is sufficient, it may be possible to automatically detect the standard used by client 28.

In a preferred embodiment of the invention, a control on each downloaded WWW page, enables an override of the conversion. An override may be required when the client includes a printer having a different type of multi-lingual support than the browser. Also, some cut-and-paste mechanism may not support multi-lingual usage. One example is visual/logical display of RTL languages.

Figure 4:
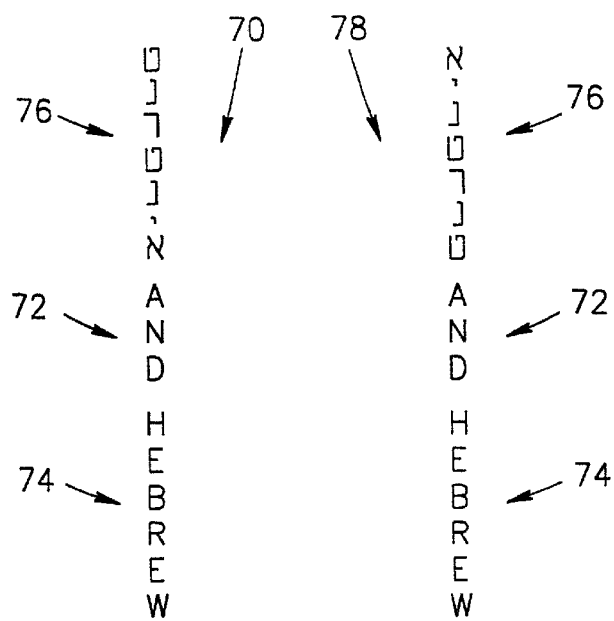
FIG. 4 shows a phrase using a visual representation and using a logical representation, for a text mixing an LTR language and an RTL language.
Figure 5:
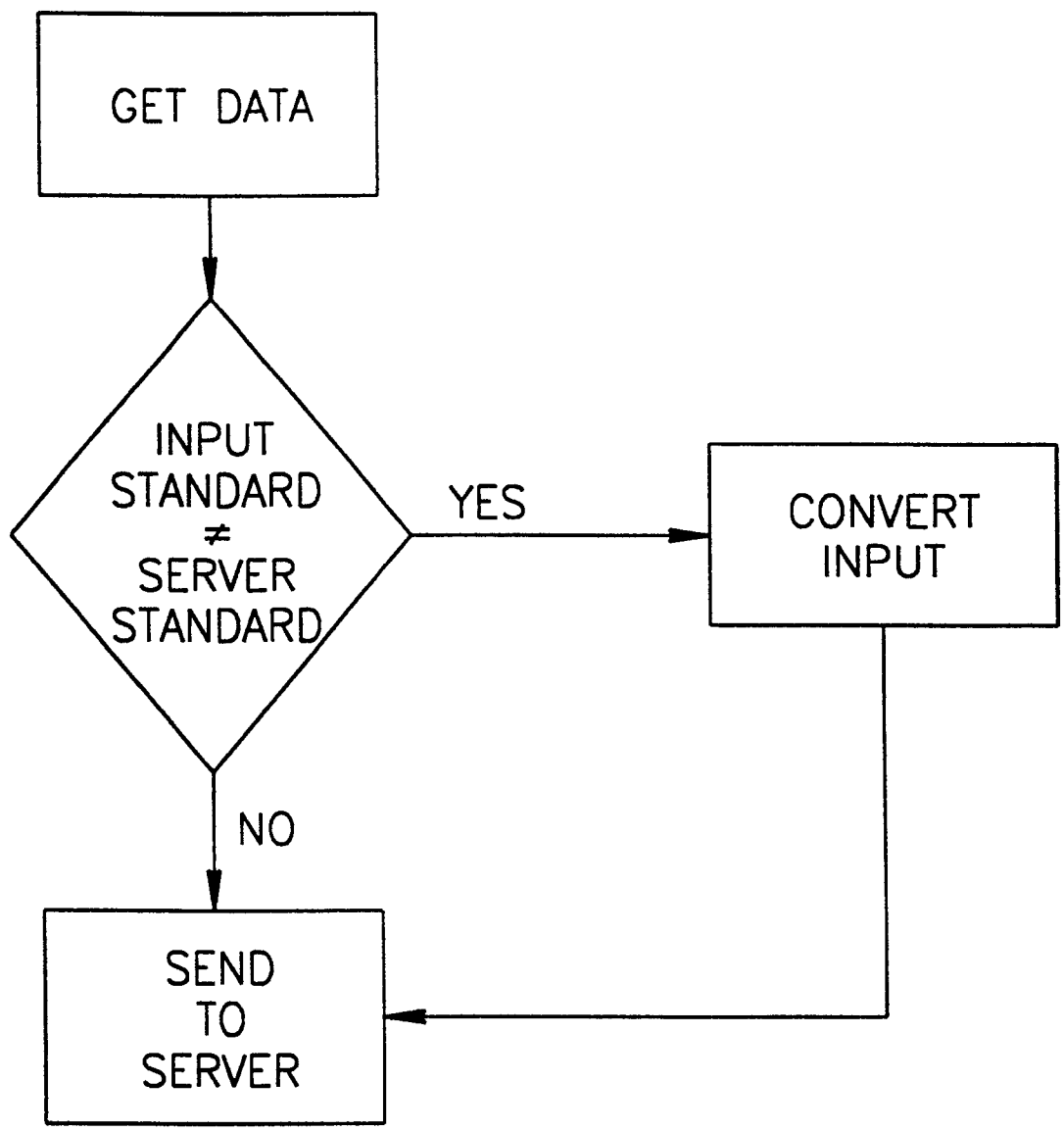
FIG. 5 is a flowchart of a process for converting input data to a standard recognized by a server, in accordance with a preferred embodiment of the invention.

FIG. 5 is a flowchart of another aspect of automatic conversion. When client 28 sends data to server 24, it may be necessary to convert the standard from a standard used by client 28 to a standard which is usable by server 24. In a particular example where server 24 is a search engine, client 28 may enter data using a logical representation. Search engines usually store data using a visual representation, as they are stored using a visual representation in most WWW pages. Thus, if the data is not converted from logical to visual, the search will probably fail. FIG. 4 shows a phrase 70, as it is displayed (visual representation), including two LTR word 72 and 74 and an RTL word 76. If phrase 70 is stored using a logical representation, shown as a phrase 78, RTL word 76 is visually meaningless but its letters are ordered in the same way as in most search databases. In such a bidirectional search, a user is well advised to enter the search terms in both visual and logical formats. In a preferred embodiment of the invention, an input object, as described below, allows a user to specify if data is to be visual or logical or both.

In a particular embodiment of the present invention, a search engine registers multi-lingual pages both before and after conversion by a converter, such as by downloading the pages both directly and through the converter. One benefit of such registration, is that pages written in an RTL language can thus be registered both in a visual representation and in a logical representation. As a result, clients can find the pages using the search engine, even without using a converter during the search.

Another problem which can be solved by converter 38 is the problem of illegal form responses. If text in a foreign language is appended to a URL (or POSTed) using the CGI.BIN standard, the characters of the response may interfere with a correct interpretation of the form response by the server. Converter 38 can indicate the existence of a problem to client 28 and recommend the user change his input. In addition, converter 38 may be able to modify the response in a way which will be understandable by server 24, but will not affect the content of the response.

An example of such a problem arises when a server sends a page encoded in Unicode (16 bits) to a 8 bit client. The client will display something, but it will probably look like gibberish. If a 16 bit client appends Unicode data to a URL and sends it to a 8-bit server the server will not be able to decipher the response.

Another aspect of conversion of data sent from client 28 to server 24 relates to tags sent in association with the actual data. One such tag is "accept-charset", in which client 28 requests data using a particular charset, since it can only display data in that charset. This indicates the limitations of client 28 to server 24. Since the use of converter 38, in accordance with preferred embodiments of the present invention, allows even a limited client to display substantially any font, converter 38 preferably modifies this tag (and other such tags) to account for the combined capabilities of converter 38 and client 28. Alternatively, converter 38 only changes the "accept-charset" tag if server 24 indicates that it cannot supply the desired information under the "accept-charset" constraint and then resends the request.

Figure 6:
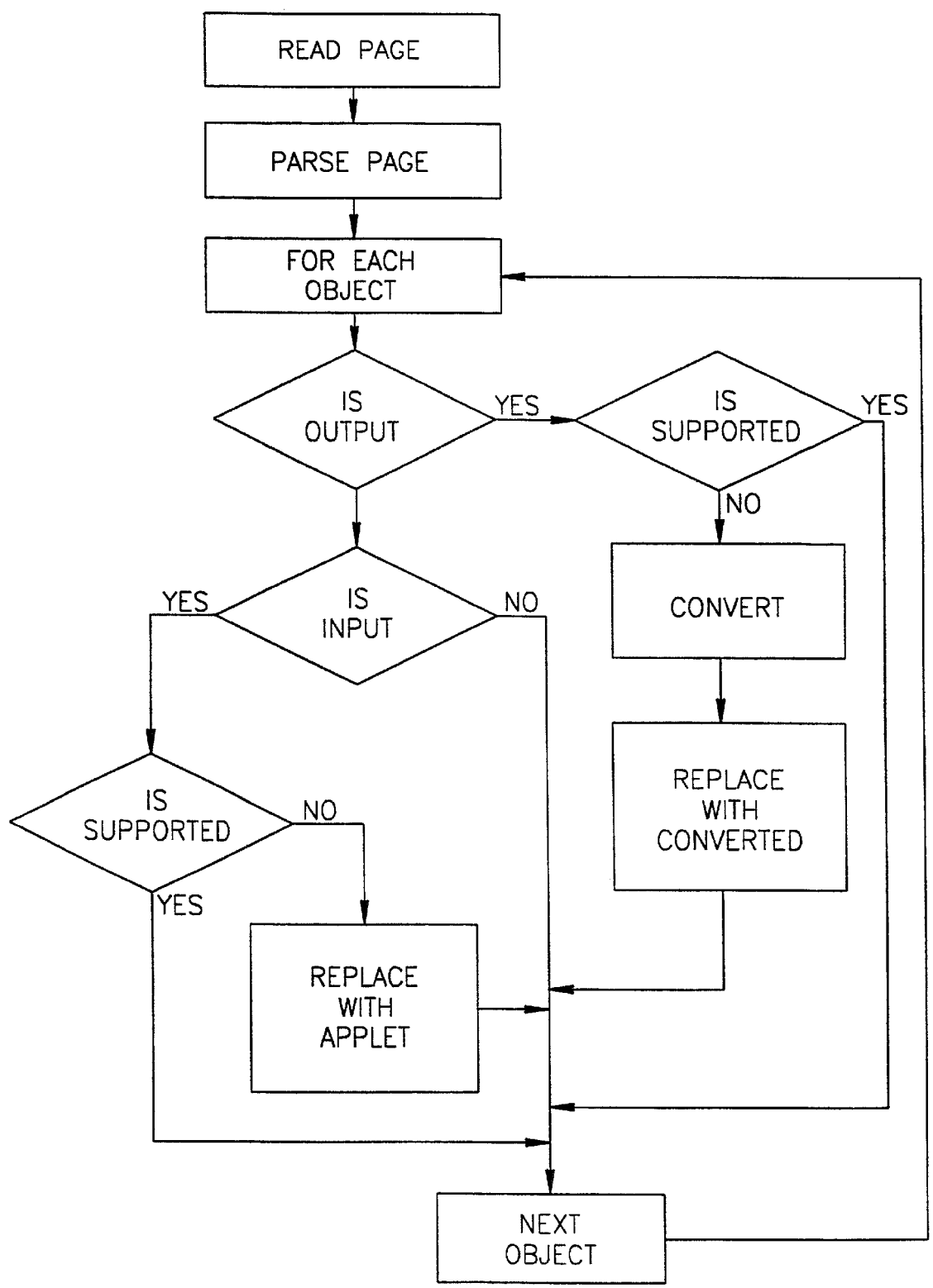
FIG. 6 is a flowchart of a process for converting input and output objects in a HTML page, in accordance with a preferred embodiment of the invention.

FIG. 6 is a flowchart of a conversion process of a WWW page in accordance with a preferred embodiment of the invention. First, converter 38 reads and parses a page. The conversion process may be effected in parallel with the parsing or it may be performed after the parsing. For each object in the WWW page, if it is an output object, converter 38 determines if the output object is supported by client 28, including, inter alia, font, character size and character encoding. If the output object is not supported by client 28, it is converted into a form which is supported by client 28 and the output object is replaced with the converted object(s). For example, in FIGS. 2A and 2B, output object 10 is replaced by an output object 14. Several types of conversion may be used. First, the output object may be replaced with a different output object which is supported by client 24. Alternatively, the output object may be replaced with a call to a Java applet which renders the output object. Preferably, such an applet is downloaded only once and different data to be rendered is submitted to the applet for each output object.

In a preferred embodiment of the invention, the output object is replaced by one or more image files, which are generated on-the-fly by converter 38. When converting text, each image preferably corresponds to a small number of words, so that if the output object is resized, the line breaks will look good. In many browsers, if an image does not fit in a display area, it is either cropped or not displayed; Text is usually folded over to the following line. To emulate this behavior, relatively small images must be used, so images that do not fit on a line will be pushed to the next line. Preferably, the number of words in each image is inversely related to the font size. Alternatively, each word is placed in a separate file. If the font is large, the word is long and/or the display area of the output object is small, a word may be broken up between two or more images. Preferably, the image files have a special file extension, such as ".B64", rather than ".GIF" so that the converter can more easily detect this type of file. The converter instructs the browser to display B64 files as GIF files.

In a preferred embodiment of the invention, the names of the created image files encode the content and/or the format of the words they replace. This encoding helps in caching, in garbage collection and, if the client is capable of rendering using a Java applet, it replaces the need to actually download the images, since they can be locally generated. Also, since the client receives the content of the output object and not only its image, makes it possible for client 28 to supply a Java applet which searches the contents for textual information. Another benefit is that the converter is relived of the necessity to maintain a table of image files and where they were sent. The following data is preferably encoded in the name: font size (one of seven), font attributes (Italic, Bold, Underline), 24 bits of color and the text content. Preferably, the following encoding scheme is used: three bits for size, three bits for attributes, 24 bits for color and N×8 bits for N 8-bit characters. The encoding may also include flags indicating the encoding scheme (such as the number of bits per character). Preferably, the encoding also includes several bits for the font family and for the language. As the encoding must use characters which are legal in WWW file names, the preferred encoding is one in which each six bits are represented by one character. The following 64 characters are preferably used to indicate the bit values of between 000000 and 111111: ABCDEFGHUJKLMNOPQRSTIJVWXYZabcdefghijklmnopqrstuvwxyz0123456-789_@

In a preferred embodiment of the invention the output object may be used to display a vertically oriented language. Displaying a vertically oriented language may require a Java applet, as will other types of output emulators.

If the object is an input object, converter 38 determines if client 28 is capable of displaying the input object. If client 28 is not capable of displaying the input object or if client 28 requested to use a different input method, which is more convenient than that supplied by his browser, the input object is replaced with a different and, usually more capable, input object. In a preferred embodiment of the invention, the replacement input object is not an input object which is supported by the client's toolkit. Rather, the input object is a Java applet which embodies the desired input method. The Java applet preferably stays resident, so it does not need to be downloaded from converter 38 very often.

Figure 7:
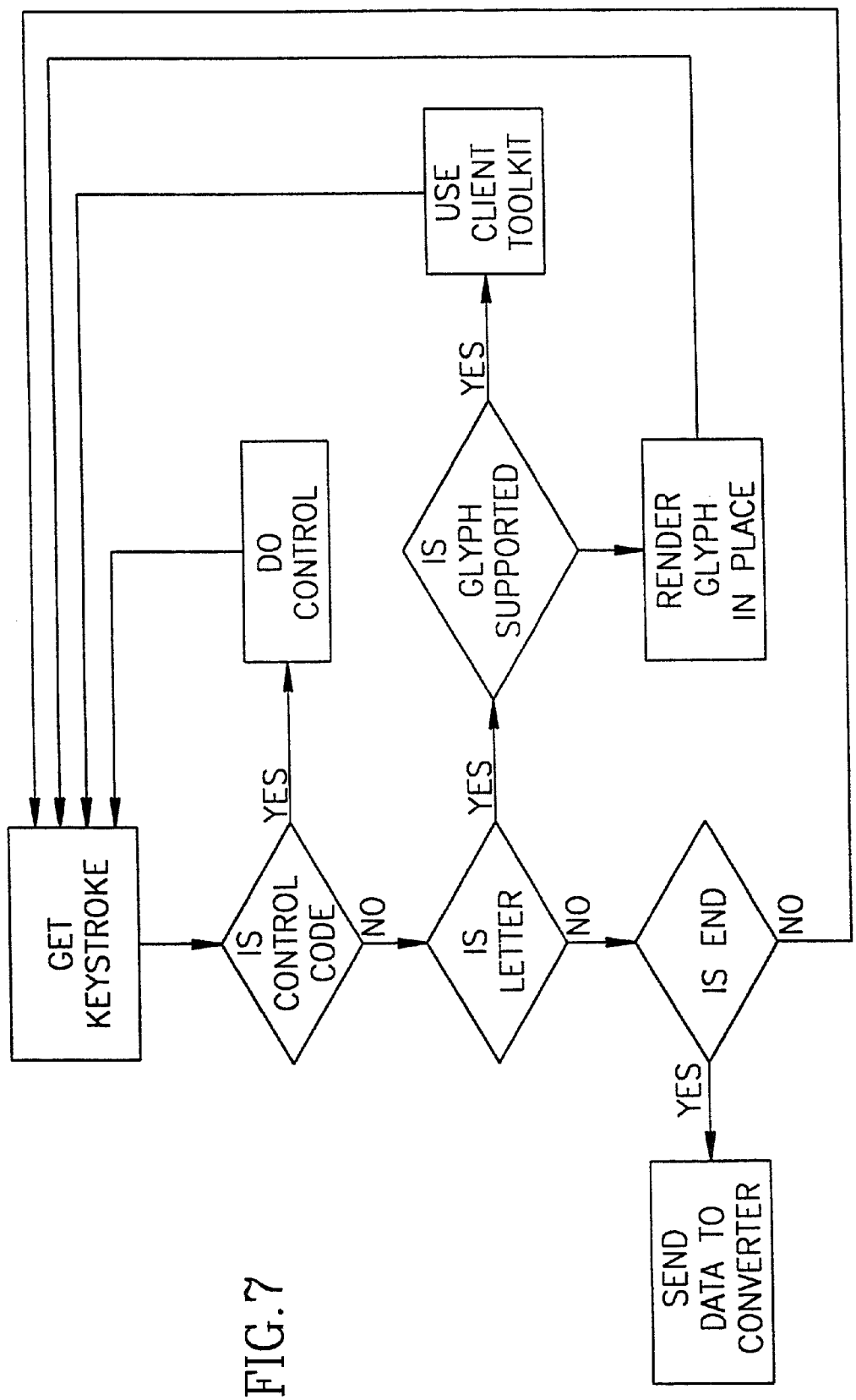
FIG. 7 is a flowchart of a Java applet which enables multi-lingual input on a single language client, in accordance with a preferred embodiment of the invention.

FIG. 7 is a flowchart of a Java applet, used for input emulation, in accordance with a preferred embodiment of the present invention. The applet preferably deals with incoming keystrokes on an individual basis. The handling of the keystrokes is dependent on the keyboard mapping supplied by the Java applet. If a keystroke is mapped to a control, the control is executed. Examples of controls include, inter alia, "backspace", "delete character", "change language and/or writing direction", "insert file", "help" (which displays a help for using the Java applet, and in particular, the keyboard mapping), "connect letters" and "compose letter". In some cases, a control may display a keyboard mapping (for output only) or a matrix of characters, which can be directly selected using a mouse.

If the keystroke is a letter, if the glyph is supported by client 28, the Java applet may use the client toolkit to render the character. Thus, the applet need only be capable of rendering characters not supported by the client toolkit. Alternatively, or if the glyph is not supported by the client toolkit, the applet renders the character glyph in the input area. In some cases, entering a letter (or a space, which usually indicates the end of a word) requires that the applet rerender a glyph as an word-end letter or even combine two letters automatically. In composed characters, such as Umlauts and Chinese pictograms, each additional "letter" is an instruction to rerender the glyph.

There are several methods of uploading the contents of the input box to the converter. As indicated above, in many cases, the inputted data should be encoded so as not to interfere with the regular operations of the client and/or server. As the Java language is defined at this date, Java applets have no interaction with any element of the WWW page, except that they can display data in their accorded display area, get input from the input devices, obtain a list of applets on the WWW page, communicate to such applets, open a socket to the applet source and (in most browsers) can request the downloading of a page. One way of sending the data to converter 38 is to replace the submit button, of which each form contains at least one, with a second Java applet which queries the other Java applets in the form before uploading the form contents. The standard submit button only queries input objects, not Java applets. In accordance with an alternative embodiment of the invention, the Java applet sends its contents to converter 38 when the data is entered thereto. When the submit button is pressed at client 28, converter 38 adds the input data it received from the Java applet to what the submit button sends. If the contents of the Java applet are over-written, it is the last entered data which is sent to server 24. In another preferred embodiment of the invention, a free-standing input object is supplied with an individual submit button.

It should be appreciated that several types of elements of the WWW page may be replaced in accordance with preferred embodiments of the invention. In particular, dates and weights can be detected in the text and converted to a format as used at client 28. Preferably, both the old value and the converted values are displayed. In addition, numeric references to particular characters can also be converted by converter 38 to new values relevant for the converted output object.

A more general aspect of the present invention relates to conversion input and output objects without relation to language. For example, converter 38 can be used to emulate input/output structures, such as tables, on browsers which do not support tables. In a preferred embodiment of the invention, converter 38 replaces an unsupported input or output structure with an indication to the user at client 28, of what the unsupported structure is, and preferably, how it may be obtained. Preferably, the converter renders the unsupported structures and sends them as images and/or as Java applets to display the structures.

In a preferred embodiment of the invention, converter 38 can be used to download Java applets, by demand, to client 28. Thus, client 28 can be a simple browser and, when needed, capability expanders in the form of Java applets are downloaded by converter 38 to client 28. Downloading applets as described above is better than replacing portions of the browser and/or using plug-ins. First, the applets are downloaded with the page that requires them and without any intervention of the client. Second, since the applet can only display information and/or handle input, they pose less of a security risk.

Downloading capability expanders by demand opens up the possibility that any individual may register a standard or a capability at converter 38, included with which there should be a Java applet for supporting the new features. When a client tries to read a WWW page in that standard, the client will receive a capability expander from converter 38. These capabilities are especially useful in Java-based browsers, which can download applets for supporting input and output objects from a converter attached to them by a LAN. Alternatively, a browser may download an updated version of itself or at least an updated version of a portion thereof from a different computer, usually not a converter. It should be appreciated that by converting the WWW pages and appending applets thereto in contrast to modifying the browser itself, there is a minimum of inference with the development of new browsers, since the applets have only a bare minimum of interaction with client 28.

In another aspect of the present invention, text based output objects are replaced with audio output objects. This is especially useful for users who have limited vision. Further, input objects may be replaced with audio input objects. The voice recognition may reside at the client or it may reside at the converter.

In accordance with another aspect of the present invention, conversion includes translating from the original language of the WWW page to a language suitable for the client. In a basic aspect of translation, translation includes transliteration from one writing form to another, such as from Japanese characters to Latin characters. Preferably, translation includes detecting the original language of the page, translating it and replacing the original text with the new text. The same process may be performed when translating input entered at client 28.

Another aspect of the present invention relates to converting data so as to reduce readability by client 28. One of the bothersome problems with the Internet is that once copyrighted information is transmitted to one computer, it can be retransmitted to many computers without any control or reimbursement of the copyright owner. A particular case is where, in a large organization, one user buys certain information from an information provider and then distributes copies of the information, by LAN to many other workers in the organization. In most cases, the copyright owner would be satisfied if the users of the information paid for each copy of the information or if they are forced to view commercial information, such as advertisements, when viewing the copyrighted information. The copyright owner can then charge money from the advertiser, for advertising space. One example of undesirable distribution is database providers, which do not wish for copies of the contents of their databases to be widely available, except to paying customers. An example of uncontrolled distribution is online data, which is freely available, but which a customer is required to view advertisements with, while viewing. Once the information is downloaded and copied, the advertisements may be removed and/or subsequent viewers of the information will not be required to pay for viewing. Most copyrighted information is textual information, however, copyrighted information also includes audio and image information.

In a preferred embodiment of the invention, copyrighted information is presented, on a computer, in such a manner that it is easily accessible to the senses of a consumer, but not easily accessible to data manipulation tools on the computer. As a result, the consumer can be forced to view advertisements or, alternatively, each viewing of the information can be controlled and/charged.

When data is transmitted from a server computer for display on a client computer, it can be easily intercepted at one of several points. Various aspects of the present invention strive to increase the difficulty of intercepting the information. A first interception point is when the data is presented on a display. Once a screenfull of text data is displayed the screen can be photographed or an image of the screen can be captured and then printed.

In a preferred embodiment of the invention, the displayed data is temporally modulated so that at any given instant only a small portion of the data is displayed. Thus, an image of the screen is not useful for a copyright infringer. The data may be temporally modulated using one of two schemes, the data may exist on the client computer and be displayed in a temporally modulated manner or the data may be downloaded, using a live connection, from the server, so that only a small portion of the data is on the client computer at any given moment.

In a preferred embodiment of the invention, data is temporally modulated by only showing a small amount of data on a screen at a time, the rest preferably being taken up by advertisements. Thus, in order to recreate the data, an infringer would be required to capture many screens and to piece together many data portions from these screens. Preferably, the location of the data portion changes between screens to increase the difficulty of automatically piecing together of the data portions. Alternatively or additionally, the copyrighted information is intermixed with the advertisements in such a manner that it can be easily separated by a human, but not by standard data manipulation programs. One example of such a display is using a different fonts or font sizes for the advertisements and for the copyrighted information.

Alternatively, the data is temporally modulated at a high enough frequency that a human can integrate the displayed data, but a screen image will only capture part of the data. One such example is flashing two partial images at a frequency higher than 30Hz. Another example is highlighting only a few words at a time, while the rest of the text is on a dark background. Yet another example, is displaying the data in a moving strip, such that only a portion of the data is simultaneously displayed.

It should be noted that some media, such as video and audio cannot be captured from a screen (or loudspeaker) with perfect quality, so an infringer will experience some degradation.

A second interception point is at the data display program itself. For example, when a WWW page is printed, the data display program (usually a browser) sends that data files directly to the printer. In a preferred embodiment of the invention, the data is not available to the data display program. Preferably, the data is made unavailable, by encoding it using an encoding scheme not recognized by the browser, but only by a server-supplied Java applet. This is an opposite to the usually situation, where the data is originally encoded in an unrecognizable manner. In most of the above described embodiment of the invention, the Java-applet "knows" how to print the data and will do so at the request of the browser. In this preferred embodiment of the invention, the Java applet will not print the data, since that would be counter-productive to the protection of the data. The encoding scheme can include, changing the character codes, using an unsupported font and changing the order of characters.

The Java applet may be downloaded anew each information transfer or it may be locally resident at the client. Alternatively, a data provider may supply a data display program, such as a browser, or even an add-in, which incorporates the functionality of the Java applet. Preferably, the Java applet transmits back to the server various information regarding, number of uses, a user number (for charging fees) and the like. It should be appreciated, that in the embodiment where the Java applet requires a live connection to the data provider and/or transmits the user number to the provider, an encapsulated copy of the copyrighted information, including both the encoded data and Java applet may be freely distributed, since, in order to view the data, some sort of control by the copyright owner will be exercised.

In a preferred embodiment of the invention, the data is encoded using a cipher. Preferably, each data packet is sent with a different key, so that continuous connection with the original provider of the data is necessary in order to decode the data. Preferably, the key is time coded so that a live connection to the data source is required. The encoding may include public-key encoding, in accordance with a preferred embodiment of the invention. It should be noted that not all the data need be encoded, it usually is only necessary to hide enough of the data so that the remaining information is degraded beyond a point which makes plain copying feasible. This type of encoding is also useful for audio-visual data, for example, for controlling viewing of pay-by-view movies in cable television systems.

In a preferred embodiment of the invention, a live connection between the Java applet and the server is preferred to reduce the chances of a "pirate" program disguising itself as a client. Preferably, the client is required to identify itself using a new code each time it runs. The server may maintain a list of all the used codes. Thus, data can only be displayed once using a particular code and additional displays required a new code. Preferably, the server also provides multi-use codes which limit the display of data to a small number of times. Alternatively or additionally, only a small portion of the information, such as an abstract, can be viewed without a proper code. Alternatively or additionally, the server uses a code to authenticate clients. The server sends a code to the client and the client is expected to send back a second code which is a function of the first code. A "pirate" program will probably not be able to respond with the correct code, especially if different codes are used each time by the server. It should be appreciated that only the codes need to be transmitted, not all the data, so the required bandwidth is very narrow.

By encoding the data using a cipher, intercepting the data along the route between the server and the client is also made difficult. Preferably, the Java applet is compiled in a manner to make it difficult to reverse engineer.

In a preferred embodiment of the invention, the data is displayed using graphical display functions rather than text based display functions, so as to limit the ease of eavesdropping on the data as it is displayed. Alternatively, the text is not displayed in a serial order, as is common, but in a random fashion, such that the display commands need to be analyzed in order to reconstruct the correct order of the displayed text. It should be appreciated that requiring a would-be infringer to store images rather than text data increases the cost of infringement to a point where it will usually not be practiced.

Alternatively or additionally, data is sent in a format which is suitable only for display, such as a low resolution graphical format. Printing such a display results in inferior quality copies. One example is works of art, which are currently transmitted at full quality. In a preferred embodiment of the invention, only an inferior quality of the data will be sent, suitable only for a particular display, unless a certain fee is paid or advertisements viewed.

As might be appreciated, there are many data providers on the Internet for which it would be desirable to protect their copyrighted information. However, each data provider would then be required to convert his data to allow for the new type of presentation. In addition, many information providers use computer programs which generate a WWW page in response to a request. A change over might require the information provider to modify these programs. In accordance with a preferred embodiment of the invention, a conversion server, as described above performs the conversion and/or the communication with the clients, on demand. Preferably, the converter only encodes the copyrighted information and not any associated advertisements. Thus, an information provider sends the copyrighted information from a data source, in its original form, to the conversion server and the conversion server converts the data to a form which is accessible to the (human) client, but not to the (computer) client. The conversion server can then provide various services in a centralized manner, including, customer payments and partitioning advertisements for particular market sectors. In an alternative preferred embodiment of the invention, the server is added on as a gateway to the data source.

It should be appreciated that in many cases, the data which is transmitted from the data source to the conversion server is already in a format suitable for the client, such as HTML. The data is preferably transmitted from the data source using an Internet protocol, such as a WWW protocol.

In an exemplary embodiment of the present invention, converter 38 is a general purpose computer with appropriate software. Alternatively, converter 38 may be a dedicated computer based on Java. As described above, converter 38 may also be embodied as part of a server computer.

It should be appreciated that the present invention is not limited by what has thus far been described. Rather, the scope of the invention is described only by the claims which follow.

What is claimed is:

1. A method for transferring information between a server and a client, through a converter, comprising:
    analyzing at least a portion of the information by said converter, to determine a standard used by said server to encode textual information in the portion; and
    replacing at least a portion of the analyzed information with other information which other information uses a second standard,
        wherein, analyzing comprises parsing the information on a syntactic level and wherein said information comprises at least one Internet hypertext document.

2. A method according to claim 1, wherein said standard comprises a language.

3. A method according to claim 1, wherein said standard comprises a standard for an RTL language.

4. A method according to any of claims 1–3, wherein replacing comprises replacing only a portion of the analyzed information.

5. A method according to claim 1, wherein said standard does not comprise a language.

6. A method according to claim 1, wherein said converter functions as an Internet proxy.

7. A method according to claim 6, wherein said proxy performs said method without requiring any changes to said server.

8. A method according to claim 6, wherein said proxy performs said method without requiring any changes to said client.

9. A method according to claim 1, wherein said method for transferring comprises an interactive connection.

10. A method according to claim 1, wherein said textual information is replaced by a more capable object.

11. A method for transferring information between a server and a client, through a converter, which information includes at least one textual input object, comprising:
    receiving said information by said converter from said server;
    replacing said textual input object with another input object; and
    transmitting the information after said replacing,
        wherein said information comprises at least one Internet hypertext document.

12. A method according to claim 11, wherein said another input object is of a type supported by said client.

13. A method according to claim 11, wherein said input object is of a type not supported by said client.

14. A method according to claim 11, wherein said input object is of a type supported by said client.

15. A method according to claim 11, wherein said replacing comprises replacing said input object responsive to a known difference in standards between said client and said server.

16. A method according to claim 11, wherein said another input object is not included in a toolkit portion of said client.

17. A method according to claim 16, wherein said another input object is a call to a program.

18. A method according to claim 17, wherein said program is a Java applet.

19. A method according to claim 11, comprising replacing a second input object with a Java applet, wherein said second input object is supported by the client.

20. A method according to claim 19, wherein second input object is a submit object.

21. A method according to claim 11, wherein said converter functions as an Internet proxy.

22. A method according to claim 21, wherein said proxy performs said method without requiring any changes to said server.

23. A method according to claim 21, wherein said proxy performs said method without requiring any changes to said client.

24. A method according to claim 11, wherein said method for transferring comprises an interactive connection.

25. A method according to claim 27, wherein said method for transferring comprises an interactive connection.

26. A method according to claim 11, wherein said textual input object is replaced by an object which emulates said object for a feature not supported by said client.

27. A method for transferring information between a server and a client, through a converter, comprising:
    analyzing at least a textual portion of the information by said converter, to determine a standard used by said server to encode the information in the portion; and
    determining at least one portion of said information whose standard is not supported by said client,
        wherein said information comprises at least one Internet hypertext document.

28. A method according to claim 27, comprising, replacing said at least one portion with a portion supported by the client.

29. A method according to claim 27 or claim 28, wherein said standard comprises a language.

30. A method according to claim 27 or claim 28, wherein said standard comprises a standard for an RTL language.

31. A method according to claim 27, wherein said standard does not comprise a language.

32. A method according to claim 27, wherein said converter functions as an Internet proxy.

33. A method according to claim 32, wherein said proxy performs said method without requiring any changes to sad server.

34. A method according to claim 32, wherein said proxy performs said method without requiring any changes to said client.

35. A method for transferring information between a server and a client, through a converter, comprising:

selecting a textual output portion of said info nation, which information is designated for the client and comprises at least one Internet hypertext document, which portion has a particular appearance when displayed by a client compatible with output portion; and replacing the output portion with other, non-textual, data, having a similar outward appearance as the output portion, when the other data is displayed by the client for which the information is designated.

36. A method according to claim 35, wherein said other data comprises image data.

37. A method according to any of claims 35–36, wherein selecting an output portion comprises selecting an output portion not compatible with said client.

38. A method according to any of claims 35–36, wherein said other data comprises a reference to a data file and wherein said reference encodes at least a portion of the content of said output portion.

39. A method according to any of claims 35–36, wherein said other data is generated on-the-fly.

40. A method according to claim 39, wherein said other data is generated at the converter.

41. A method according to claim 35, wherein said converter functions as an Internet proxy.

42. A method according to claim 41, wherein said proxy performs said method without requiring any changes to said server.

43. A method according to claim 41, wherein said proxy performs said method without requiring any changes to said client.

44. A method according to claim 35, wherein said method for transferring comprises an interactive connection.

45. A method according to claim 35, wherein said textual output object is replaced with a plurality of output objects, at least one of which is non-textual.

46. A method according to claim 35, wherein said textual output object is partially replaced.

47. A method according to claim 35, wherein said textual output object is replaced by a more complex output object.

48. A method according to claim 35, wherein said textual output object is replaced by an output object which emulates said output object for a feature not supported by said client.

49. A method for transferring information between a server and a client, through a converter, each of said client and said server using different standards to encode said information, comprising:

receiving data from said client;

changing textual data from said received data from a known standard of the client to a known standard of the server; and transmitting said changed data to said server, wherein said data and said changed data comprise at least one Internet hypertext document and wherein at least some of said data relates to a standard not related to language.

50. A method according to claim 49, wherein said standards differ in language.

51. A method according to claim 49 or claim 50, wherein said standards differ in logical/visual representation of an RTL language.

52. A method according to any of claims 49–50, wherein said standards differ in character set encoding.

53. A method according to any of claims 49–50, wherein said standards differ in character bit width.

54. A method according to claim 49, wherein said converter function as an Internet proxy.

55. A method according to claim 54, wherein said proxy performs said method without requiring any changes to said server.

56. A method according to claim 54, wherein said proxy performs said method without requiring any changes to said client.

57. A method according to claim 49, wherein said method for transferring comprises an interactive connection.

58. Apparatus for brokering the transmission of information between a server and a client, comprising:

a connection to said client;

a connection to said server; and a converter which receives an internet hypertext document from the server through the connection to the server, determines a standard used by the server to encode textual information, changes a non-textual object in the document responsive to said determined standard and transmits the changed document to the client through the connection to the client.

59. Apparatus according to claim 58, wherein said converter adds an object to the document.

60. Apparatus according to claim 58 or claim 59, wherein said converter removes an object from the document.

61. Apparatus according to any of claims 58–59, wherein said object comprises an object to be displayed by said client.

62. Apparatus according to any of claims 58–59, wherein said object comprises an object which accepts input at said client.

63. Apparatus according to any of claims 58–59, comprising a server.

64. Apparatus according to claim 63, wherein the server and the converter are comprised in a single computer.

65. Apparatus according to claim 64, wherein the server and the converter operate as a single process.

66. Apparatus according to claim 58, wherein said converter functions as an Internet proxy.

* * * * *

UNITED STATES PATENT AND TRADEMARK OFFICE
CERTIFICATE OF CORRECTION

PATENT NO. : 6,601,108 B1
DATED : July 29, 2003
INVENTOR(S) : Eliyahu Marmor

It is certified that error appears in the above-identified patent and that said Letters Patent is hereby corrected as shown below:

<u>Title page,</u>
Item [56], References Cited, OTHER PUBLICATIONS, fourth reference, change "PNEW0615002" to -- PNEW06150002 --

<u>Column 22,</u>
Lines 31 and 32, change "non-textual object in the document" to -- textual object in the document to a non-texual object --

Signed and Sealed this

Eighteenth Day of May, 2004

JON W. DUDAS
*Acting Director of the United States Patent and Trademark Office*